US010936061B2

(12) United States Patent
Brennan et al.

(10) Patent No.: US 10,936,061 B2
(45) Date of Patent: Mar. 2, 2021

(54) EYE TRACKING USING REVERSE-BIASED LIGHT-EMITTING DIODE DEVICES

(71) Applicant: Facebook Technologies, LLC, Menlo Park, CA (US)

(72) Inventors: Vincent Brennan, Cork (IE); Patrick Joseph Hughes, Cork (IE); Pooya Saketi, Cork (IE); Andrew John Ouderkirk, Kirkland, WA (US); William Anthony Wall, Cork (IE)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/572,966

(22) Filed: Sep. 17, 2019

(65) Prior Publication Data

US 2020/0089318 A1 Mar. 19, 2020

Related U.S. Application Data (60) Provisional application No. 62/732,406, filed on Sep. 17, 2018.

(51) Int. Cl.
*G06F 3/01* (2006.01)
(52) U.S. Cl.
CPC .................................. *G06F 3/013* (2013.01)
(58) Field of Classification Search
CPC ...................................................... G06F 3/013
See application file for complete search history.

(56) References Cited

U.S. PATENT DOCUMENTS

| 10,062,357 | B2* | 8/2018 | Woodgate | G02B 6/0011 |
|---|---|---|---|---|
| 10,594,916 | B2* | 3/2020 | Sivan | G06F 3/012 |
| 2013/0335225 | A1 | 12/2013 | Wen | |
| 2015/0326570 | A1* | 11/2015 | Publicover | H04N 5/247 |
| | | | | 726/4 |
| 2018/0307905 | A1* | 10/2018 | Gustafsson | G06F 3/013 |

FOREIGN PATENT DOCUMENTS

WO 2015192117 A1 12/2015

OTHER PUBLICATIONS

International Application No. PCT/US2019/051508, International Search Report and Written Opinion dated Jan. 8, 2020, 12 pages.
Zaxariadis et al., Single-Touch and Multi-Touch Led Screen, XP055653323, Available Online At: https://www.researchgate.net/directory/profiles/john_ellinas/publication/267561027_single_touch_and_multi-touch_LED_screen/links/56a1e3ea08ae24f62702d0ec/single-touch-and-multi-touch-LED-screen.pdf, Jan. 22, 2016, 6 pages.

* cited by examiner

*Primary Examiner* — Muhammad N Edun
(74) *Attorney, Agent, or Firm* — Kilpatrick Townsend & Stockton (57) ABSTRACT

Techniques related to eye tracking using reverse-biased light-emitting diode (LED) devices are disclosed. In some embodiments, a viewing apparatus comprises a reverse-biased LED device that is positioned within a field-of-view of an eye. The reverse-biased LED device receives light reflected from the eye and generates signal based on the received light. The generated signal is used to determine a position of the eye.

21 Claims, 9 Drawing Sheets

EYE TRACKING USING REVERSE-BIASED LIGHT-EMITTING DIODE DEVICES

CROSS-REFERENCE TO RELATED APPLICATIONS

This application claims the benefit of U.S. Provisional Application No. 62/732,406, filed Sep. 17, 2018, entitled "Eye Tracking Using Reverse-Biased Light-Emitting Diode Devices" which is incorporated herein by reference in its entirety.

BACKGROUND

The disclosure relates generally to computer vision, and more specifically to eye tracking using reverse-biased light-emitting diode (LED) devices.

Computer vision has broad applications in various fields, such as human-computer interaction (HCI), computer simulations, and/or sentiment analysis. For example, in HCI, computer vision has been gaining popularity as a mechanism for receiving touchless input from a user. Typically, a camera is used to capture images of the user, and these images are subsequently processed to interpret the user's intent. However, the significant weight and power consumption of cameras make them impractical for some purposes, such as incorporation into wearable devices.

SUMMARY

This disclosure relates to eye tracking using reverse-biased LED devices. In some embodiments, user intent is gleaned based on eye position (e.g., presence, location, and/or orientation). For example, detecting a gaze to the left may cause selection of data to the left, and detecting a gaze to the right may cause selection of data to the right. Advantageously, eye position can be determined using reverse-biased LED devices, which are lightweight and have low power requirements. This makes them particularly suitable for incorporation into wearable devices.

LED devices can be reverse-biased to serve as photodiodes. Thus, reverse-biased LED devices can convert light into a signal (e.g., an electrical signal and/or a digital signal). The light that is converted comprises light reflected from an eye. The resulting signal can be used to determine positional information about the eye. For example, in a grid of reverse-biased LED devices, the location of the pupil may correspond to the location of a reverse-biased LED device that generates little to no signal, because the pupil generally reflects little, if any, light.

BRIEF DESCRIPTION OF THE DRAWINGS

Illustrative embodiments are described with reference to the following figures.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Described herein are techniques that enable eye tracking using reverse-biased LED devices. More specifically, reverse-biased LED devices may serve as photodetectors. Thus, they can detect light reflected from an eye and generate a signal based on the detected light. The generated signal can be used to determine a position of the eye.

Some embodiments involve the use of inorganic LEDs known as microLEDs. As used herein, a microLED may refer to an LED that has an active light-emitting area with a linear dimension that is less than 50 µm, less than 20 µm, or less than 10 µm. For example, the linear dimension may be as small as 2 µm or 4 µm. Advantageously, such small sizes enable microLEDs to be lightweight and virtually invisible. Thus, they can be incorporated into a wearable apparatus in close proximity to the eye, thereby enabling eye tracking with increased accuracy, reduced bill of materials, and reduced power requirements.

Example LED Device

Figure 1:
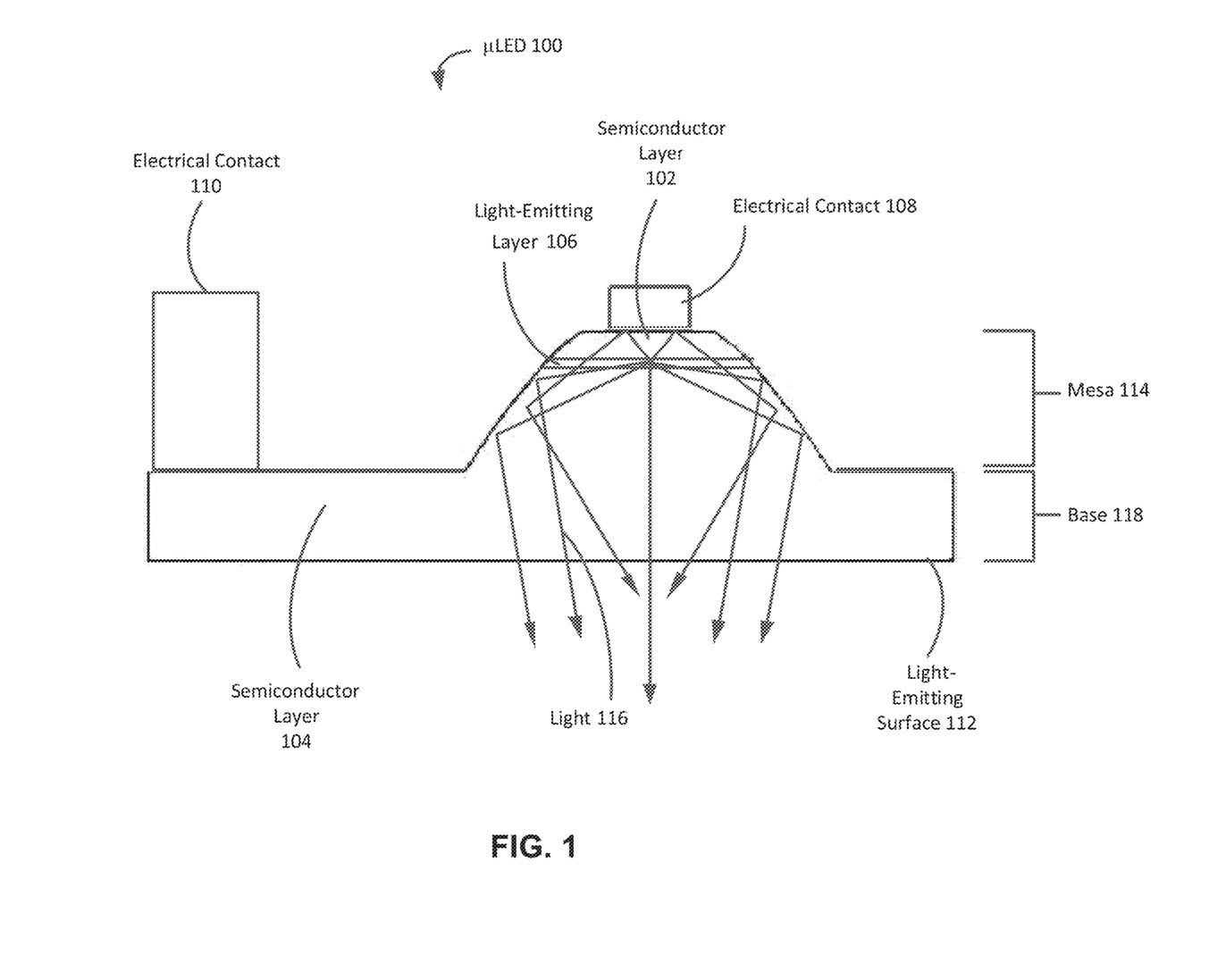
FIG. 1 illustrates an example LED device, in accordance with an embodiment.

Referring to FIG. 1, a cross-sectional view of an example microLED 100 is provided. The microLED 100 includes, among other components, a semiconductor structure. The semiconductor structure comprises semiconductor layers 102-104 and a light-emitting layer 106 situated between the semiconductor layers 102-104. For example, the microLED 100 may comprise a semiconductor structure in which the light-emitting layer 106 is a layer of gallium arsenide that is sandwiched between a layer of p-type aluminum gallium arsenide and a layer of n-type aluminum gallium arsenide. In some embodiments, semiconductor layer 102 is a p-type semiconductor, and semiconductor layer 104 is an n-type semiconductor. In some embodiments, semiconductor layer 102 is an n-type semiconductor, and semiconductor layer 104 is a p-type semiconductor.

The semiconductor layers 102-104 are operatively coupled to electrical contacts 108-110, respectively. The electrical contacts 108-110 are typically made of a conductive material, such as a metallic material. In the example of FIG. 1, the electrical contacts 108-110 are both located on a top surface of the semiconductor structure such that they can both support the microLED 100 when it is mounted on a substrate. However, in some embodiments, electrical contacts can be located on opposite surfaces of a semiconductor structure.

The light-emitting layer 106 includes one or more quantum wells that output of light 116 when a voltage is applied across the electrical contacts 108-110 such that the microLED 100 is forward-biased. To directionalize the output of light 116, the semiconductor structure may be formed into any of a variety of shapes (e.g., a paraboloid, a cylinder, or a cone) that enable collimation/quasi-collimation of light 116. Such shapes are referred to herein as "mesa" shapes; and collimation and quasi-collimation are collectively referred to herein as "collimation." Collimation results in increased intensity of light output.

Significantly, when a voltage is applied across the electrical contacts 108-110 such that the microLED 100 is reverse-biased, the microLED 100 works in reverse. More specifically, the reverse-biased microLED 100 works as a photodetector to convert light into an electrical signal. As used herein, the term "microLED" encompasses both forward-biased and reverse-biased microLEDs even though a reverse-biased microLED does not emit light. In other words, a reverse-biased microLED is thus named, because it shares the same or similar physical structure as a forward-biased microLED. However, the physical structure is used in reverse. In particular, to amplify the electrical signal, the mesa-shaped optical element can be used in reverse in a manner akin to a satellite dish. Thus, microLED 100 can intensify received light based on focusing the received light at the light-emitting layer 106, where the light is converted into an electrical charge or current.

In the example of FIG. 1, mesa 114 corresponds to a paraboloid shape that guides light 116 from the light-emitting layer 106 toward a light-emitting surface 112 of the semiconductor structure. Additionally or alternatively, the mesa 114 can be used to guide received light (not shown) toward the light-emitting layer 106 from the light-emitting surface 112. As mentioned above, the light-emitting layer 106 is approximately positioned at the focal point of the paraboloid. This enables some of the emitted light to be reflected, within a critical angle of total internal reflection, off the inner walls of the paraboloid toward the light-emitting surface 112. Additionally or alternatively, this enables some of the received light to be reflected, within a critical angle of total internal reflection, off the inner walls of the paraboloid toward the light-emitting layer 106.

In some embodiments, a mesa shape also has a truncated top that can accommodate an electrical contact. In the example of FIG. 1, mesa 114 corresponds to a paraboloid shape having a truncated vertex that accommodates electrical contact 108. Base 118 refers to the part of the semiconductor structure that is not included in the mesa 114.

The microLED 100 may include other components, such as a dielectric layer, a reflective layer, and a substrate layer. However, to avoid obscuring the disclosure, such components are not illustrated in FIG. 1.

Example Viewing Apparatus

Figure 2A:
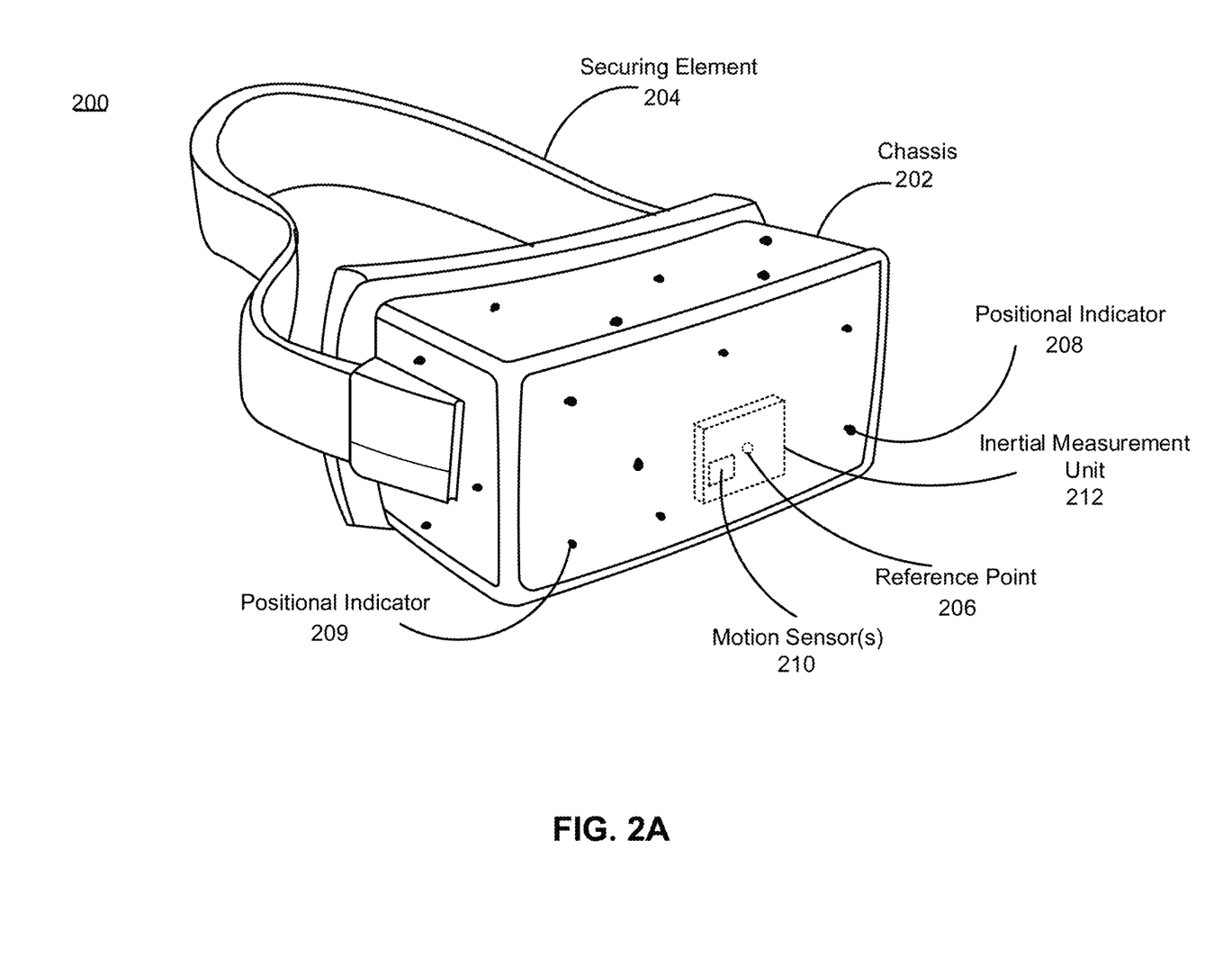
FIG. 2A AND FIG. 2B illustrate an example viewing apparatus, in accordance with an embodiment.

FIG. 2A illustrates an example viewing apparatus 200. In the example of FIG. 2A, the viewing apparatus 200 is an artificial reality headset device comprising a display unit (not shown) that can be used to present content (e.g., audio, video, and/or images) to a user. As used herein, the term "artificial reality" encompasses virtual reality (VR), augmented reality (AR), or mixed reality (MR). In some embodiments, the viewing apparatus 200 may have a substantially transparent surface through which a user can view the surrounding environment.

The viewing apparatus 200 comprises a chassis 202 and a securing element 204. The chassis 202 may be composed of a plastic or some other lightweight material. The securing element 204 enables the viewing apparatus 200 to be positioned on a user's head. Examples of the securing element 204 include, without limitation, an elastic band, an adjustable strap, and/or a padded head covering.

One or more surfaces of the chassis 202 may comprise positional indicators 208-209 that can be used to determine an orientation of the viewing apparatus 200. The positional indicators 208-209 are objects located in specific positions on the viewing apparatus 200 relative to each other and to a reference point 206. Examples of the positional indicators 208-209 include, without limitation, a corner cube reflector, a reflective marker, an LED device, and/or a type of light source that contrasts with an environment in which the viewing apparatus 200 operates. Although only two positional indicators 208-209 are discussed with reference to FIG. 2A, it should be appreciated that the viewing apparatus 200 may comprise any number of positional indicators. The positional indicators 208-209 are discussed in greater detail below with reference to FIG. 8.

The reference point 206 may be any point that can be used to describe the position of the viewing apparatus 200. In the example of FIG. 2A, the reference point 206 refers to the center of an inertial measurement unit (IMU) 212.

The viewing apparatus 200 may also comprise motion sensor(s) 210 and the IMU 212.

The motion sensor(s) 210 and the IMU 212 may be used to determine a change in the orientation of the viewing apparatus 200. More specifically, the IMU 212 is an electronic device that generates calibration data reflecting a change in orientation of the viewing apparatus 200. The change in orientation is detected using the motion sensor(s) 210. Examples of the motion sensor(s) 210 include, without limitation, accelerometer(s), gyroscope(s), magnetometer(s), and/or sensor(s) used for error correction of the IMU 212. The IMU 212 is discussed in greater detail below with reference to FIG. 8. Thus, the motion sensor(s) 210 generate one or more measurement signals in response to detecting a motion of the viewing apparatus 200. The one or more measurement signals are sent to the IMU 212, which generates calibration data based on measurement signals. Calibration data is discussed in greater detail below with reference to FIG. 8.

Figure 2B:
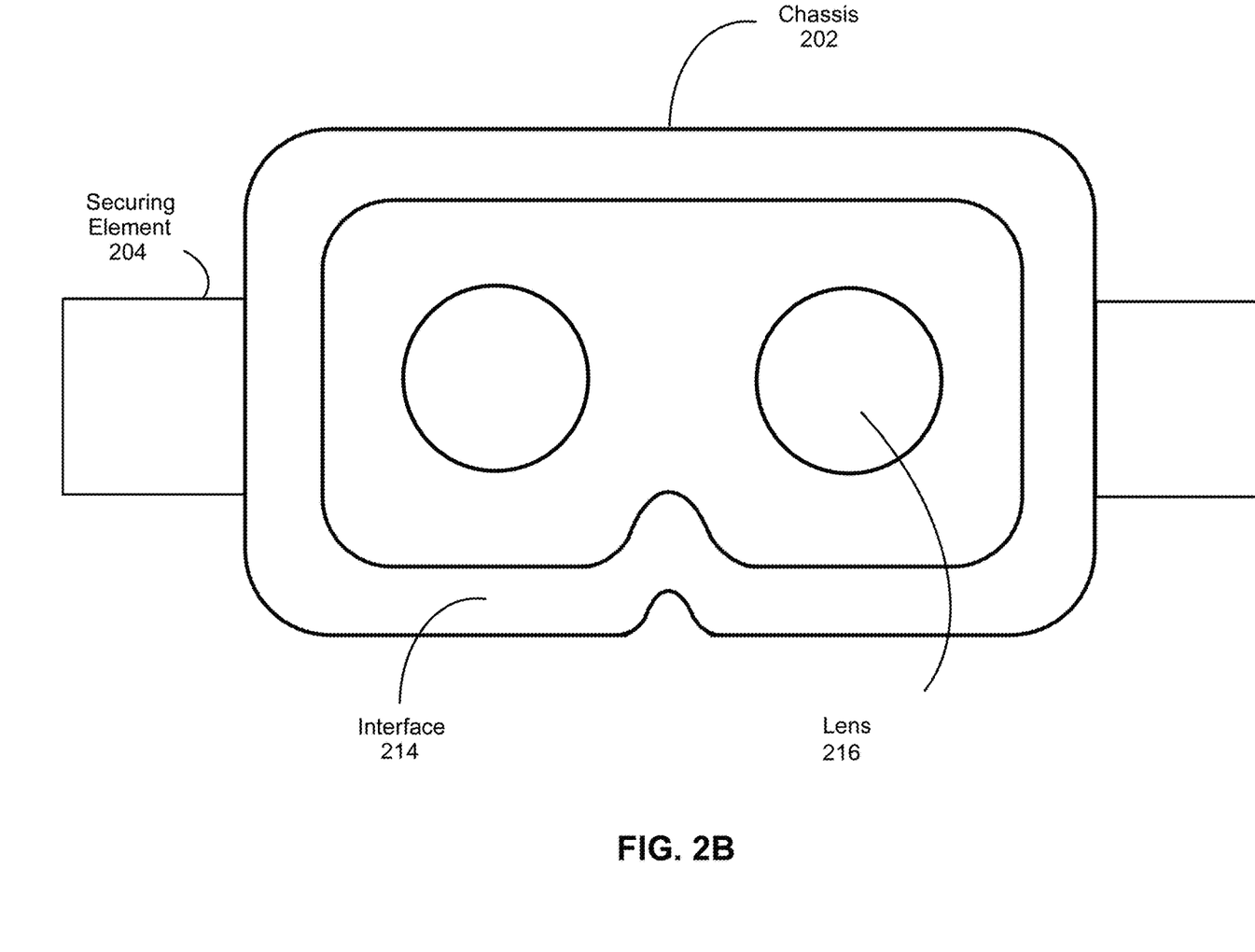

FIG. 2B illustrates the example viewing apparatus 200 from the perspective of a user. In the example of FIG. 2B, the viewing apparatus 200 comprises an interface 214 that may be composed of rubber, foam, and/or some other material that conforms to the contours of a user's face. In effect, the interface 214 seals out light from regions where the viewing apparatus 200 comes into contact with the user's face.

In the example of FIG. 2B, the viewing apparatus 200 comprises a lens 216 through which a user can view a display unit and/or real-world objects on the other side of the lens 216. Although FIG. 2B illustrates a separate lens for each eye, in some embodiments, the viewing apparatus 200 may comprise a single lens. Examples of the lens 216 include, without limitation, a flat lens, a convex lens, a concave lens, and/or a Fresnel lens. As will be described in greater detail below, the lens 216 may comprise multiple layers.

Figure 3:
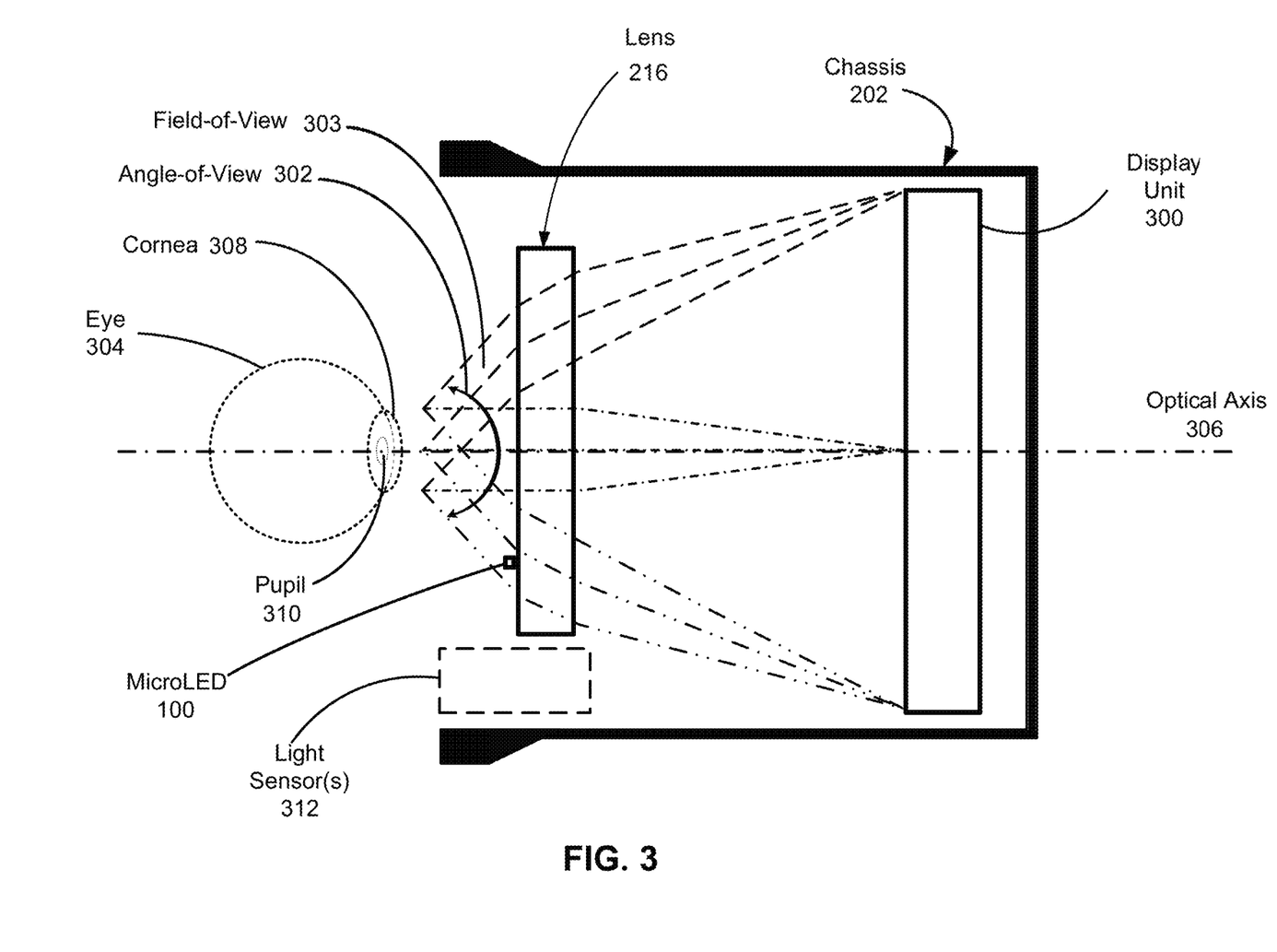
FIG. 3 illustrates a cross-sectional view of the example viewing apparatus, in accordance with an embodiment.

FIG. 3 illustrates a cross-sectional view of the example viewing apparatus 200. In the example of FIG. 3, the viewing apparatus 200 comprises a display unit 300. The display unit 300 presents media to a user in accordance with input received by the viewing apparatus 200. The display unit 300 may comprise a liquid crystal display (LCD), an organic light-emitting diode (OLED) display, an activematrix organic light-emitting diode display (AMOLED), a transparent organic light-emitting diode display (TOLED), a projector, and/or some other type of display.

The display unit 300 is within a field-of-view of the lens 216. As used herein, a "field-of-view" refers to an area that can be observed by an eye and/or an optical element. Example optical elements include, without limitation, an aperture, a flat lens, a Fresnel lens, a convex lens, a concave lens, a filter, a polarizer, a diffuser, a fiber taper, and/or any other suitable optical element that affects the light emitted from the display unit 300.

In turn, some of the lens 216 is within a field-of-view 303 of an eye 304 looking through the lens 216 toward the display unit 300. In the example of FIG. 3, the field-of-view 303 corresponds to a fixed area within an angle-of-view 302 determined when the eye 304 is looking along an optical axis 306 that is perpendicular to a visible surface of the display unit 300. Thus, the field-of-view 303 remains the same even when the eye 304 looks in a different direction.

Light emitted from the display unit 300 travels through the lens 216 and toward the eye 304. In some embodiments, the lens 216 directs light from the display unit 300 toward the eye 304, thereby magnifying the light emitted from the display unit 300. This enables the display unit 300 to have a reduced size, a reduced weight, and reduced power requirements.

In some embodiments, the lens 216 is integrated with one or more illumination sources for tracking movement of the eye 304. Thus, the one or more illumination sources are positioned within the field-of-view 303 of the eye 304. Significantly, positioning illumination sources within the field-of-view 303 enables the eye 304 to be illuminated with sufficient light regardless of the orientation of the eye 304 and/or eye shapes that vary from person to person. As a result, eye tracking can be performed with increased accuracy.

In some embodiments, the one or more illumination sources comprise one or more microLEDs, such as the microLED 100. As mentioned above, microLEDs are lightweight and virtually invisible due to their microscopic size. Thus, they can be positioned within the field-of-view 303 without significantly compromising a user's view through the lens 216. Furthermore, mesa-shaped microLEDs are significantly more energy efficient than LEDs without mesa shapes. This enables reducing the number of illumination sources.

In some embodiments, the one or more illumination sources may illuminate the eye 304 with light in an invisible range of the electromagnetic spectrum. For example, a microLED illumination source may emit near-infrared light having a wavelength between 780 and 1100 nanometers. Thus, not only the illumination sources, but the light used to perform eye tracking may be imperceptible to a user.

Light that illuminates the eye 304 may be reflected from the eye 304 and captured by one or more photodetectors, such as light sensor(s) 312, that each output a digital and/or electrical signal proportional to the captured light. Depending on the one or more illumination sources, the spectral sensitivity of the one or more photodetectors may be in a visible range or an invisible range of the electromagnetic spectrum. The one or more photodetectors may be based on single-point detection (e.g., photodiodes, balanced/matched photodiodes, or avalanche photodiodes) or based on one or two-dimensional photodetector arrays (e.g., a camera, a linear photodiode array, a charge-coupled device sensor array, or a complementary metal-oxide-semiconductor sensor array).

In the example of FIG. 3, the optional light sensor(s) 312 are positioned outside the field-of-view 303. Thus, the optional light sensor(s) 312 may track a raised formation on the eye 304 known as a cornea 308. For example, illumination sources may emit light that forms a structured pattern, and the optional light sensor(s) 312 may be used to detect distortions in the structured light pattern caused by contour changes attributable to the cornea 308.

However, commercial photodetectors may suffer from a number of drawbacks. For example, they may consume significant amounts of power, have significant sizes and weights, and/or exhibit difficulty performing eye tracking quickly and/or accurately.

Described below are various eye tracking techniques that do not suffer from some of the aforementioned drawbacks. Each of the techniques involve positioning photodetectors within the field-of-view 303 of the eye 304. For example, the photodetectors may be integrated with the lens 216. Photodetectors positioned within the field-of-view 303 may be used to track an opening in the center of the eye 304 known as a pupil 310. Typically, light transmitted into the pupil 310 is not reflected back from the eye 304. As such, the position of the pupil 310 may be determined based on locations where little to no light is detected.

Example Eye-Tracking Systems

Figure 4:
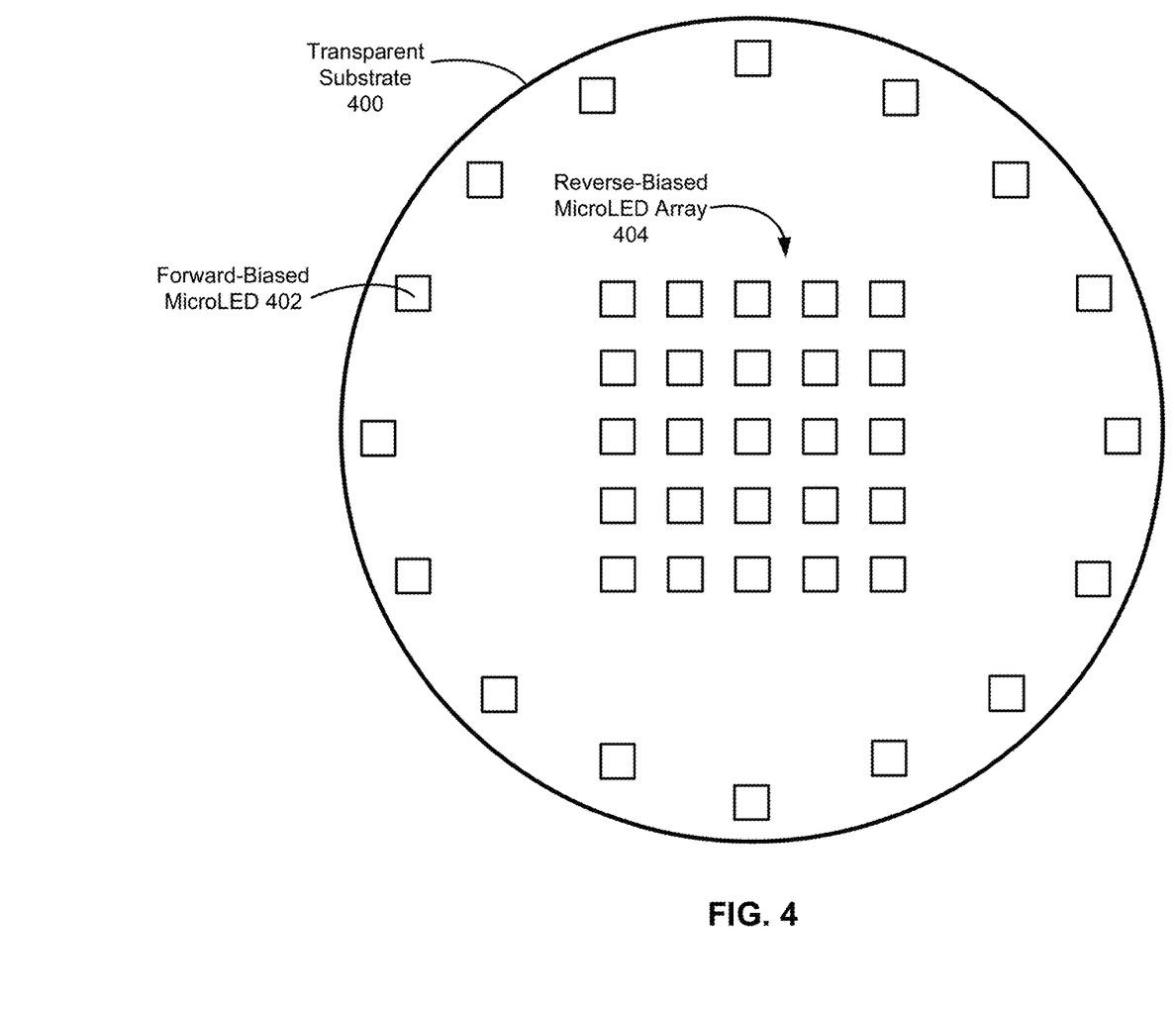
FIG. 4 illustrates an example configuration of uni-modal LEDs, in accordance with an embodiment.

FIG. 4 illustrates an example eye-tracking system comprising microLEDS positioned on an optional transparent substrate 400, which may be a layer of the lens 216. As used herein, the term "transparent" encompasses both transparent and quasi-transparent qualities. For example, the transparent substrate 400 may be an anti-reflective layer composed of glass, quartz, plastic, polymer, ceramic, or crystal. The transparent substrate 400 is positioned in front of the eye 304 such that the transparent substrate 400 is situated between the lens 216 and the eye 304. Thus, any light emitted from the microLEDs reaches the eye 304 without passing through the lens 216.

In the example of FIG. 4, there are two sets of microLEDs—a set of microLEDs used as illumination sources and a set of microLEDs used as photodetectors. The illumination set comprises a set of microLEDs, including forward-biased microLED 402, configured in a ring near the edge of the transparent substrate 400 (e.g., inside or outside the field-of-view 303). The photodetection set comprises a 5×5 reversed-biased microLED array 404 near the center of the transparent substrate 400.

It should be appreciated that the example microLED configuration of FIG. 4 is provided for explanation purposes and that other arrangements are possible. Any number of microLEDs may be used to implement an eye-tracking system using any of a variety of linear (e.g., one-dimensional and/or two-dimensional arrays) and/or non-linear (e.g., one or more rings) arrangements. In particular, it should be appreciated that the 5×5 array described herein is a toy example and that implementations having denser arrays are contemplated. Furthermore, in some embodiments, distances between microLEDs of the array may vary from region to region in order to account for varying distances between the eye 304 and the lens 216. For example, microLEDs near the center of the lens 216 may be spaced closer together than microLEDs toward the perimeter of the lens 216.

As mentioned above, microLEDs are lightweight and virtually invisible due to their microscopic size. Thus, they can be positioned within the field-of-view 303 without significantly compromising a user's view through the lens 216. This makes reverse-biased microLEDs particularly suitable for use as photodetectors in wearable devices.

However, their microscopic size can also cause reverse-biased microLEDs to be inefficient as photodetectors. To increase their efficiency as photodetectors, reverse-biased microLEDs can have mesa shapes that focus received light toward one or more quantum wells.

The example microLED configuration of FIG. 4 may also comprise circuitry (not shown) integrated with the lens 216. At least some of the circuitry may be composed of a transparent conductive oxide (e.g., indium tin oxide or zinc oxide); transparent polymers (e.g., Poly(3,4-ethylenedioxythiophene)); nanoparticulate metal or ink; and/or other conductors that are transparent to visible light. Additionally or alternatively, the circuitry may comprise metal traces having a width of less than 100 μm, less than 50 μm, or even less than 20 μm. Advantageously, transparent portions of the circuitry can be positioned within the field-of-view 303 without significantly compromising a user's view through the lens 216.

Any of a variety of circuitry configurations may be used. For example, each microLED may be individually or collectively connected to a power source, but each microLED of the photodetection set may be individually connected to an analog-to-digital converter (ADC). Use of microLED arrays for photodetection is described in greater detail below with reference to FIG. 6A, FIG. 6B, AND FIG. 6C.

In some embodiments, the example eye-tracking system of FIG. 4 also includes the light sensor(s) 312. For example, the microLEDs may be used to determine an approximate eye position, and the light sensor(s) 312 may be used to refine the approximate eye position.

Advantageously, microLEDs dedicated for uni-modal (e.g., illumination or photodetection but not both) operation enables optimization for such operation. For example, a microLED dedicated for photodetection can be fitted with a microlens that increases sensitivity to light reflected from the eye 304. More specifically, the microlens may enable sensitivity to light reflected, by the cornea 308 of the eye 304, in a direction that is not parallel to the optical axis 306. This may be particularly helpful for microLEDs mounted near the perimeter of the lens 216, where light reflected by the cornea 308 can have a high angle relative to the surface normal of the transparent substrate 400. The microlens may have a size that is similar to the microLED package and/or mounting area. Additionally or alternatively, a microLED dedicated for photodetection may be mounted on the transparent substrate 400 in a tilted fashion that increases sensitivity to light having different angles of incidence relative to the transparent substrate 400. Additionally or alternatively, a microLED dedicated for photodetection may have a spectral filter to reduce the range of wavelengths detected by the microLED.

However, in some embodiments, one or more microLEDs serve as both illumination sources and photodetectors but at different times. As will be described in greater detail below, this can be achieved based on converting a forward-biased microLED into a reverse-biased microLED and vice versa. Advantageously, operating microLEDs bi-modally enables reducing the bill of materials, which reduces weight and space consumption.

Figure 5:
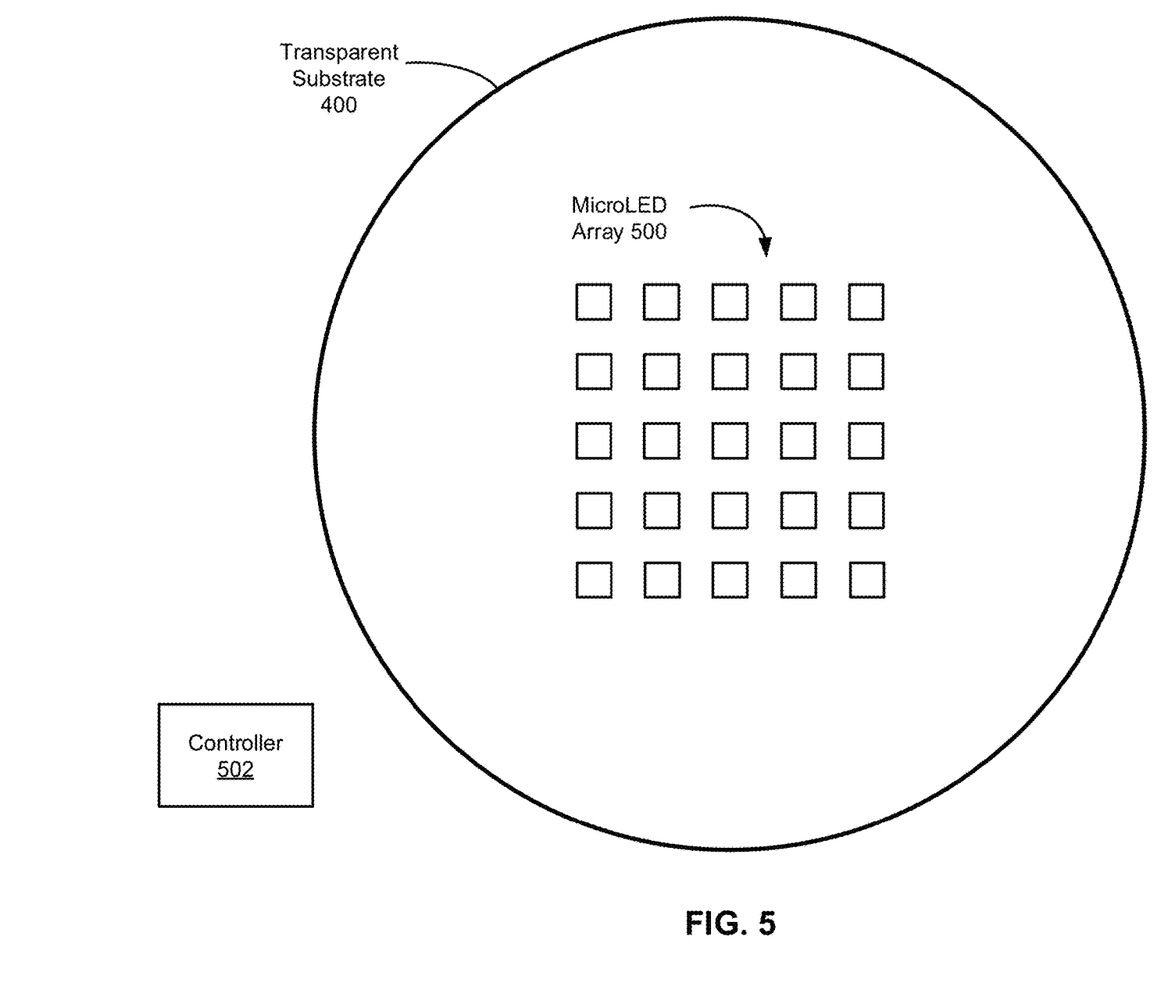
FIG. 5 illustrates an example configuration comprising one or more bi-modal LEDs, in accordance with an embodiment.

FIG. 5 illustrates an example eye-tracking system comprising one or more bi-modal microLEDs. Thus, some or all of the microLEDs in array 500 may operate as both illumination sources and photodetectors but at different times. For example, only the microLEDs forming the perimeter of the array 500 may operate bi-modally, whereas all of the microLEDs in the array 500 may operate as photodetectors.

The one or more bi-modal microLEDs may be connected individually or collectively to one or more controllers, such as controller 502. The one or more controllers enable switching a bi-modal microLED between a light-emitting state (e.g., a forward-biased state) and a photodetection state (e.g., a reverse-biased state). Converting a forward-biased microLED into a reverse-biased microLED and vice versa may be achieved using any of a variety of conversion techniques. Example conversion techniques include, without limitation, inverting voltage, inverting current direction, or reducing voltage below a threshold of resistance.

The one or more controllers may be programmed to perform the switching at certain times. For example, a controller may be programmed to switch a bi-modal microLED to a photodetection mode immediately after the microLED emits light and to switch the microLED to a light-emitting mode after a predetermined time. The predetermined time may be the same for all bi-modal microLEDs, or the predetermined time may vary from microLED to microLED depending on the location of the microLED. In some embodiments, the predetermined time is a fixed value that causes switching to be performed at regular intervals (e.g., every 0.25 seconds). In some embodiments, the predetermined time is calibrated based on measuring the round trip time for light to travel from a bi-modal microLED to a user's eye and back to the microLED.

It should be appreciated that the example microLED configuration of FIG. 5 is provided for explanation purposes and that other arrangements are possible. Any number of microLEDs may be used to implement an eye-tracking system using any of a variety of linear (e.g., one-dimensional and/or two-dimensional arrays) and/or non-linear (e.g., one or more rings) arrangements. In particular, it should be appreciated that the 5×5 array described herein is a toy example and that implementations having denser arrays are contemplated. Furthermore, in some embodiments, distances between microLEDs of the array may vary from region to region in order to account for varying distances between the eye 304 and the lens 216. For example, microLEDs near the center of the lens 216 may be spaced closer together than microLEDs toward the perimeter of the lens 216.

The example microLED configuration of FIG. 5 may also comprise circuitry (not shown) integrated with the lens 216. At least some of the circuitry may be composed of a transparent conductive oxide (e.g., indium tin oxide or zinc oxide); transparent polymers (e.g., Poly(3,4-ethylenedioxythiophene)); nanoparticulate metal or ink; and/or other conductors that are transparent to visible light. Additionally or alternatively, the circuitry may comprise metal traces having a width of less than 100 μm, less than 50 μm, or even less than 20 μm. Advantageously, transparent portions of the circuitry can be positioned within the field-of-view 303 without significantly compromising a user's view through the lens 216.

Any of a variety of circuitry configurations may be used. For example, each microLED may be individually or collectively connected to a power source, but each microLED may be individually connected to an analog-to-digital converter (ADC). Use of microLED arrays for photodetection is described in greater detail below with reference to FIG. 6A, FIG. 6B, AND FIG. 6C.

In some embodiments, the example eye-tracking system of FIG. 5 also includes the light sensor(s) 312. For example, the microLEDs may be used to determine an approximate eye position, and the light sensor(s) 312 may be used to refine the approximate eye position.

In some embodiments, at least some of the microLEDs in FIG. 5 may be optimized in a manner that is compatible with bi-modal operation. For example, a microLED may be fitted with a microlens that enables further collimation of light emitted from a microLED and that increases sensitivity to light traveling along a path that is not parallel to the optical axis 306. Additionally or alternatively, a microLED may be mounted on the transparent substrate 400 in a tilted fashion that enables emitted light to travel parallel to the optical axis 306 and that increases sensitivity to light having different angles of incidence relative to the transparent substrate 400. Additionally or alternatively, a microLED may be fitted with a spectral filter that enables transmission of light emitted by the microLED and that reduces the range of wavelengths detected by the microLED.

Example Photodetection Signals

Figure 6A:
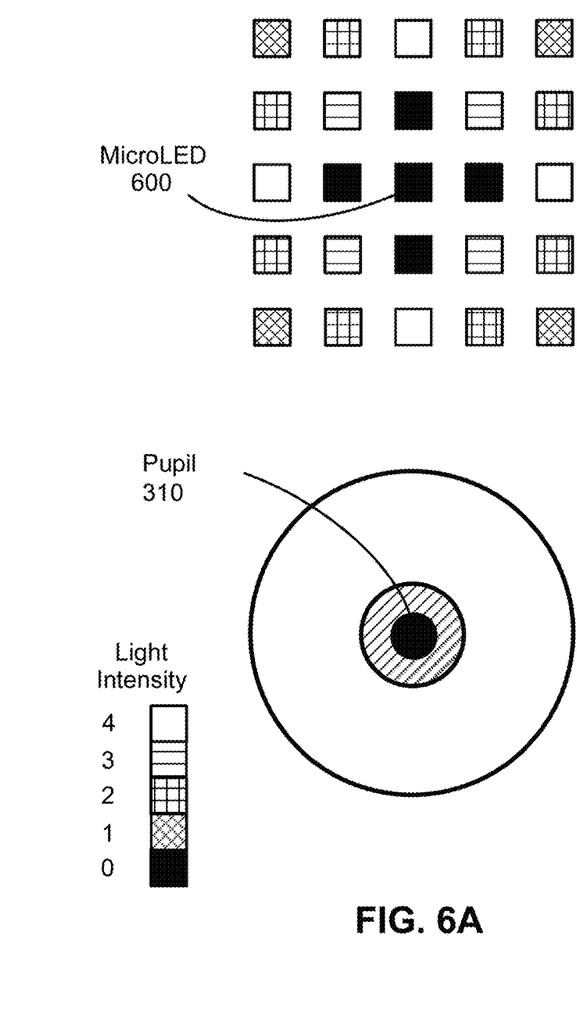
FIG. 6A, FIG. 6B, AND FIG. 6C illustrate example patterns of signals corresponding to various eye positions, in accordance with an embodiment.
Figure 6B:
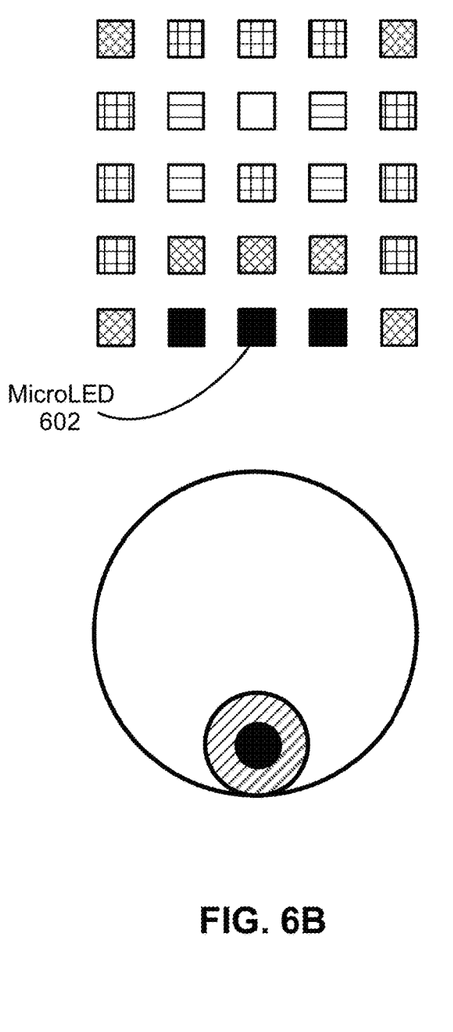
Figure 6C:
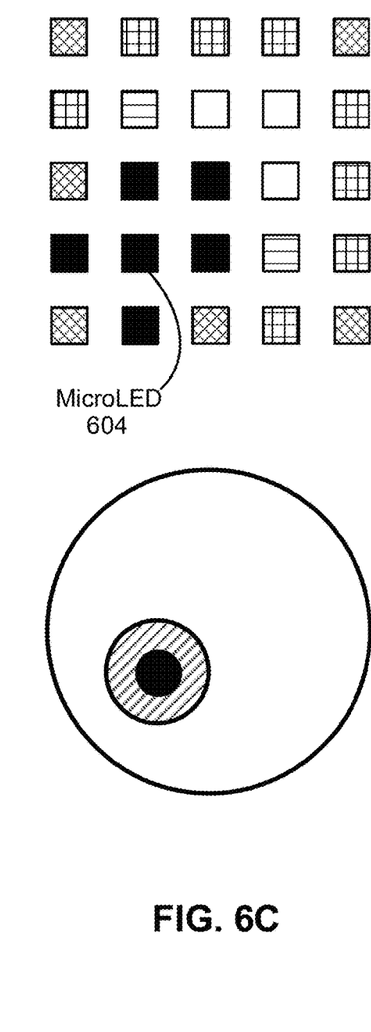

FIG. 6A, FIG. 6B, AND FIG. 6C illustrate example signal patterns corresponding to various eye positions. Provided at the bottom left corner of the illustration is a legend that maps a light intensity value to a symbol that can correspond to a color. For example, the numeric value "0" may correspond to a very dark color, whereas the numeric value "4" may correspond to a very light color. Although the examples of FIG. 6A, FIG. 6B, AND FIG. 6C are illustrated using only five different values, it should be appreciated that any number of values can be used.

FIG. 6A illustrates an example signal pattern when the eye 304 is looking at the center of the display unit 300. One or more processors of the viewing apparatus 200 may generate and/or use the signal pattern to infer that microLED 600 corresponds to the location of the pupil 310, because microLED 600 is near the center of a cross formation where relatively little light is detected.

FIG. 6B illustrates an example signal pattern when the eye 304 is looking toward the bottom center of the display unit 300. One or more processors of the viewing apparatus 200 may generate and/or use the signal pattern to infer that microLED 602 corresponds to the location of the pupil 310, because microLED 602 is near the center of a linear formation where relatively little light is detected.

FIG. 6C illustrates an example signal pattern when the eye 304 is looking toward the bottom right of the display unit 300. One or more processors of the viewing apparatus 200 may generate and/or use the signal pattern to infer that microLED 604 corresponds to the location of the pupil 310, because microLED 604 is near the center of a cross formation where relatively little light is detected.

In each of FIG. 6A, FIG. 6B, AND FIG. 6C, the 5×5 signal pattern may correspond to signals generated from microLED array 404 or 500. It should be appreciated that the example signal patterns of FIG. 6A, FIG. 6B, AND FIG. 6C are provided for explanation purposes and that other signal patterns are possible. In particular, it should be appreciated that the 5×5 signal pattern described above is a simplified example and that implementations having denser signal patterns are contemplated.

Process Overview

Figure 7:
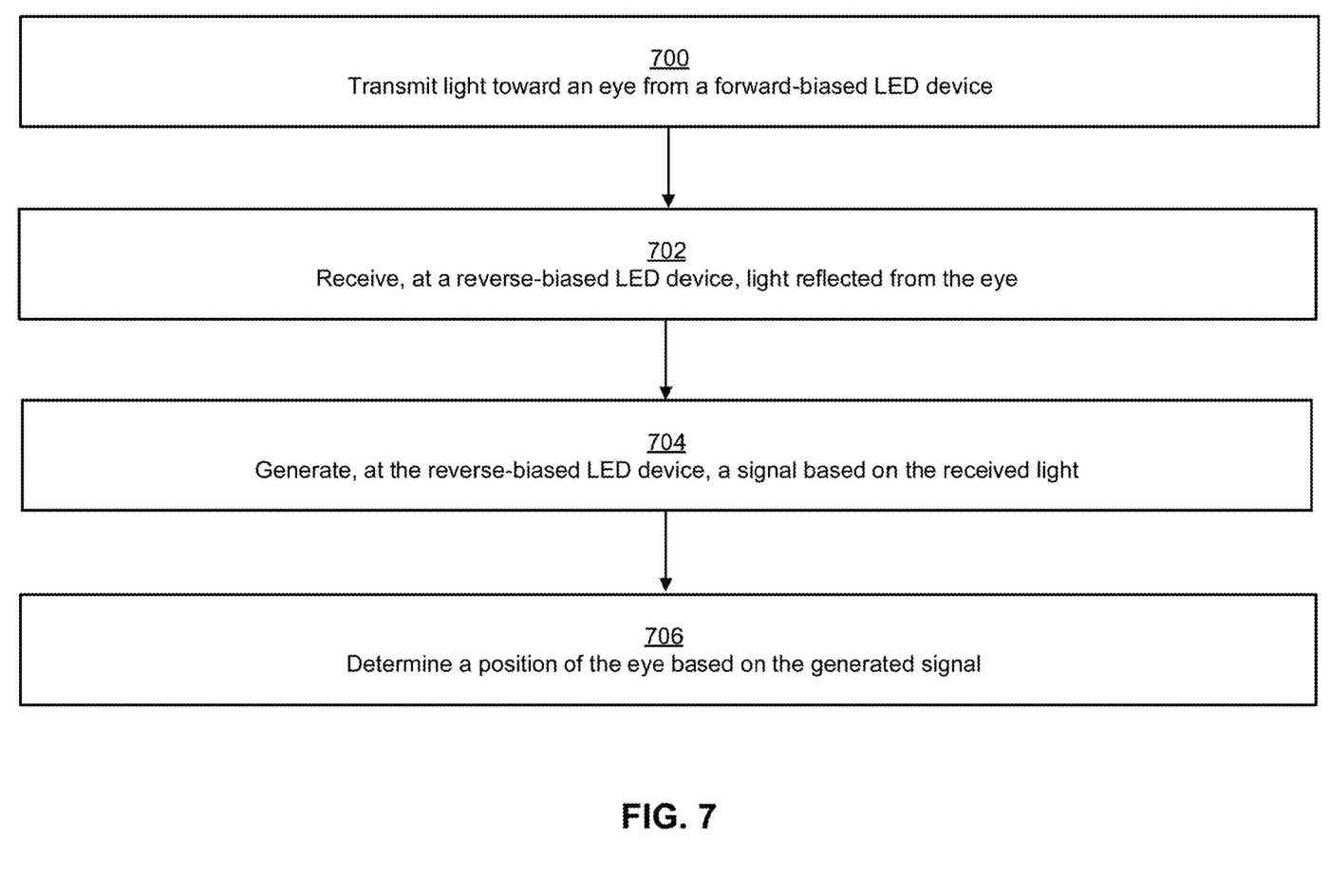
FIG. 7 is a flow diagram illustrating an example approach for eye tracking using reverse-biased LED devices, in accordance with an embodiment.

FIG. 7 illustrates an example process for performing eye tracking using reverse-biased LED devices. In some embodiments, the example process is performed at a viewing apparatus comprising a microLED eye-tracking system.

At block 700, light is transmitted toward an eye from a forward-biased LED device. In some embodiments, the forward-biased LED device is positioned within a field-of-view of the eye. For example, the forward-biased LED device may be positioned on a lens assembly of the viewing apparatus.

At block 702, light reflected from the eye is received at a reverse-biased LED device. In some embodiments, the reverse-biased LED device is positioned within the field-of-view of the eye. For example, the reverse-biased LED device may be positioned on a lens assembly of the viewing apparatus. In some embodiments, the forward-biased LED device is converted into the reverse-biased LED device and vice versa.

At block 704, the reverse-biased LED device generates a signal based on the received light. The signal may be an electrical current, and its amplitude may be magnified based on a mesa-shaped optical element of the reverse-biased LED device. More specifically, the mesa-shaped optical element intensifies the received light based on focusing the received light toward a p-n semiconductor junction.

At block 706, a position of the eye is determined based on the generated signal. For example, the reverse-biased LED device may be included in an array of reverse-biased LED devices. Each device in the array may be positioned within the field-of-view of the eye such that each device is pointed at a different part of the eye. Based on which devices generate a signal and/or the strength of the signal that is generated, the position (e.g., the presence, location, and/or the orientation) of the eye may be determined.

In some embodiments, determining the position of the eye involves multiple phases. In one phase, one or more reverse-biased LED devices may be used to determine an approximate position of the eye. In another phase, one or more non-LED sensors (e.g., light sensor(s) 312) may be used to refine the approximate position of the eye. Advantageously, determining eye position in multiple phases may reduce latency related to determining the position of the eye.

System Overview

Figure 8:
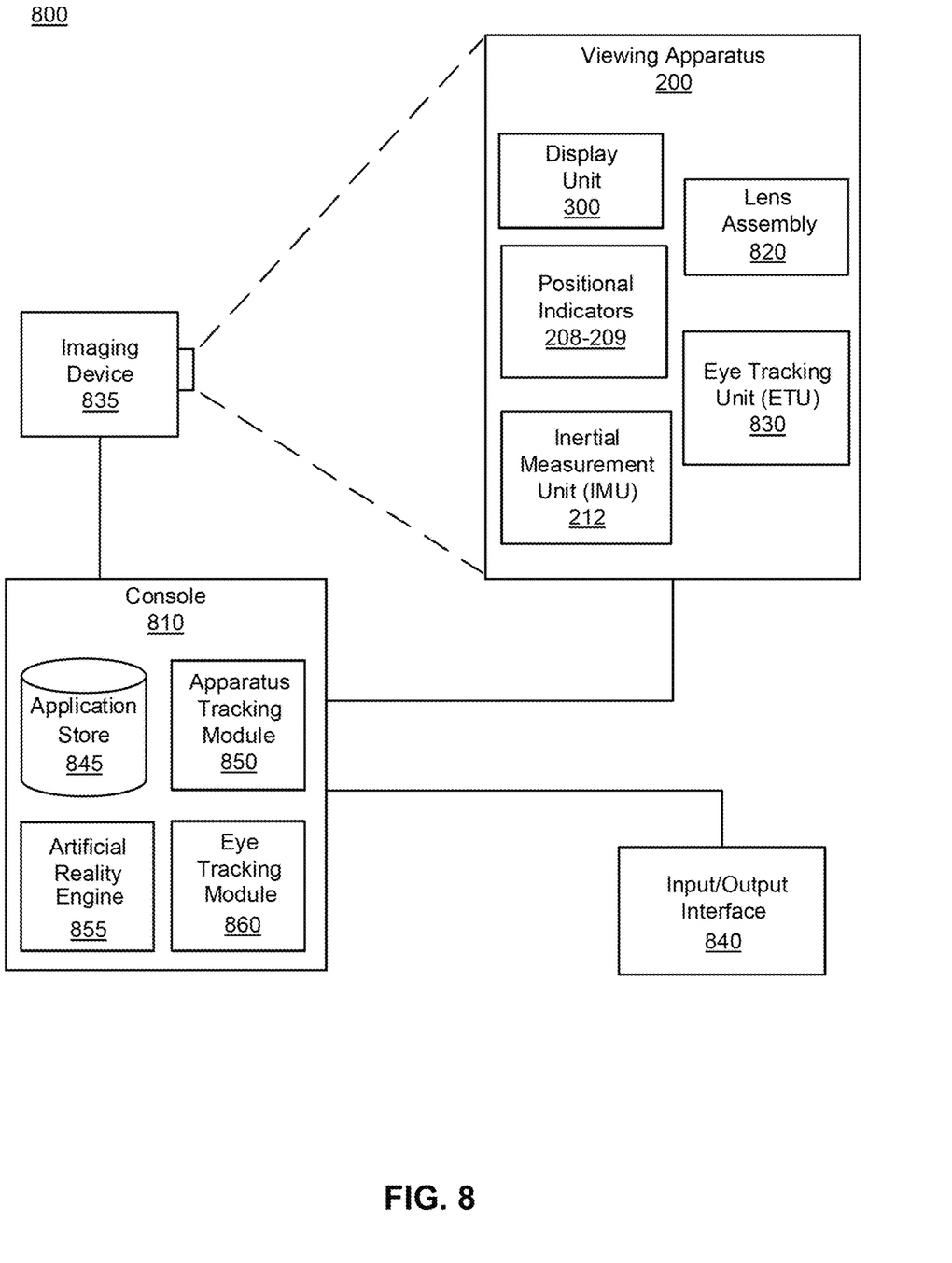
FIG. 8 illustrates an example system comprising the viewing apparatus of FIG. 2A AND FIG. 2B, in accordance with an embodiment.

FIG. 8 is a block diagram of an example artificial reality system 800 in which the viewing apparatus 200 operates. The system 800 shown by FIG. 8 comprises the viewing apparatus 200, an imaging device 835, and an input/output (I/O) interface device 840 that are each coupled to the console 810. While FIG. 8 shows an example system 800 including one viewing apparatus 200, one imaging device 835, and one I/O interface device 840, in other embodiments any number of these components may be included in the system 800. For example, there may be multiple viewing apparatuses each having an associated I/O interface device and being monitored by one or more imaging devices, with each viewing apparatus, I/O interface device, and imaging device communicating with the console 810. In alternative configurations, different and/or additional components may be included in the system 800. Similarly, functionality of one or more of the components can be distributed among the components in a different manner than is described here. For example, some or all of the functionality of the console 810 may be contained within the viewing apparatus 200.

In some embodiments, audio is presented via an external device (e.g., speakers and/or headphones) that receives audio information from the viewing apparatus 200, the console 810, or both. In such embodiments, the external device (not shown) presents audio data based on the audio information.

In some embodiments, the viewing apparatus 200 may present VR, AR, MR, or some combination thereof to a user. In the AR and/or MR embodiments, the viewing apparatus 200 may augment views of a physical, real-world environment with computer-generated elements (e.g., images, video, and/or sound).

The viewing apparatus 200 includes a display unit 300, a lens assembly 820, an eye tracking unit (ETU) 830, an IMU 212, and positional indicators 208-209. Some embodiments of the viewing apparatus 200 have different components than those described here. Similarly, the functions can be distributed among other components in the system 800 in a different manner than is described here.

The display unit 300 displays video and/or images to the user in accordance with data received from the console 810. As mentioned above, the video and/or images enable user immersion in an artificial reality.

The lens assembly 820 comprises a lens having one or more layers. For example, the lens assembly 820 may comprise a lens and a transparent substrate. The lens assembly 820 is integrated with one or more microLEDs. The one or more microLEDs are part of the ETU 830. The lens assembly 820 is also integrated with circuitry configured to supply electrical current to the one or more microLEDs. The one or more microLEDs may be positioned within the field-of-view of the eye.

The ETU 830 tracks a user's eye movement. The ETU 830 includes an illumination source to project light onto a portion of the user's eye, and a photodetector to collect reflected and/or scattered light from the illuminated portion of the eye. In some embodiments, the illumination source includes one or more microLEDs integrated with the lens assembly 820. In some embodiments, the photodetector includes one or more microLEDs integrated with the lens assembly 820. In some embodiments, the photodetector includes one or more non-LED sensors positioned outside the field-of-view of the eye.

The ETU 830 uses the tracked eye movement to determine the position of the eye. Determining eye position may involve determining a presence of the eye and/or determining an orientation of the eye (e.g., an angle of eye-gaze and/or eye-gaze location). Based on the detected eye movement, the ETU 830 may communicate with the console 810 for further processing. The console 810 can adjust displayed images and/or video. For example, the console 810 can perform foveated rendering of the displayed images based on the determined orientation of the user's eye. In other words, the console 810 may provide a maximum pixel density only in a foveal region of the user's eye-gaze, while a lower pixel resolution can be used in other regions.

In some embodiments, the ETU 830 allows a user to interact with content presented to the user based on the detected eye movement. Example interactions by the user with presented content include, without limitation, selecting a portion of content (e.g., selecting an object presented to the user), movement of a cursor or a pointer, navigating through content, presenting content to the user based on a gaze location of the user, or any other suitable interaction with content presented to the user.

The ETU 830 determines eye-tracking information using data from the photodetector. Eye-tracking information describes a position of an eye of the user. Example eye-tracking information may include, without limitation, gaze angle, eye orientation, and/or inter-pupillary distance. As mentioned above, the ETU 830 may be used to determine an approximate position of the eye. As will be described below, the approximate position may be refined using an eye-tracking module 860.

Some embodiments of the ETU 830 have different components than those described with reference to FIG. 8. For example, the ETU 830 may include one or more illumination sources, one or more photodetectors, and a controller. The controller determines eye-tracking information using data from the photodetector. For example, in some embodiments, the controller identifies locations where light is reflected from an eye of a user and determines a position and orientation of the eye based on the locations. In cases where the eye is illuminated with a structured light pattern, the controller can detect distortions of the structured light pattern projected onto the eye, and estimate a position and orientation of the eye based on the detected distortions. The controller can also estimate a pupillary axis, a gaze angle (e.g., corresponds to a foveal axis), a translation of the eye, a torsion of the eye, and a current shape of the eye.

Similar to the manner in which reverse-biased LED devices can be used to determine an approximate eye position that is subsequently refined, the IMU 212 may be used to generate "fast" calibration data that describes an approximate change in orientation of the viewing apparatus 200 as a whole. The fast calibration data may then be refined using "slow" calibration data.

For example, the IMU 212 may include accelerometers to measure translational motion (e.g., forward/back, up/down, and/or left/right) and/or gyroscopes to measure rotational motion (e.g., pitch, yaw, and/or roll). The IMU 212 may sample measurement signals from the accelerometers and/or gyroscopes. The sampled signals may be used to calculate an estimated position of the viewing apparatus 200. To illustrate, the IMU 212 may integrate the measurement signals received from the accelerometers over time to estimate a velocity vector and may integrate the velocity vector over time to determine an estimated position of the viewing apparatus 200. Alternatively, the IMU 212 may provide the sampled measurement signals to the console 810, which determines the fast calibration data.

The IMU 212 receives one or more calibration parameters from the console 810. As further discussed below, the one or more calibration parameters are used to maintain tracking of the viewing apparatus 200. Based on a received calibration parameter, the IMU 212 may adjust one or more IMU parameters (e.g., sample rate). In some embodiments, certain calibration parameters cause the IMU 212 to update an initial position of the reference point so it corresponds to a next calibrated position of the reference point. Updating the initial position of the reference point at the next calibrated position of the reference point helps reduce accumulated error associated with the determined estimated position. The accumulated error, also referred to as drift error, causes the estimated position of the reference point to "drift" away from the actual position of the reference point over time.

The imaging device 835 generates slow calibration data in accordance with calibration parameters received from the console 810. Slow calibration data includes one or more images showing observed positions of the positional indicators 208-209 that are detectable by the imaging device 835. The imaging device 835 may include one or more cameras, one or more video cameras, any other device capable of capturing images including one or more of the positional indicators 208-209, or some combination thereof. Additionally, the imaging device 835 may include one or more hardware and software filters (e.g., used to increase signal to noise ratio). The imaging device 835 is configured to detect light emitted or reflected from the positional indicators 208-209 in a field of view of the imaging device 835. In embodiments where the positional indicators 208-209 include passive elements (e.g., a retroreflector), the imaging device 835 may include a light source that illuminates some or all of the positional indicators 208-209, which retro-reflect the light towards the light source in the imaging device 835. Slow calibration data is communicated from the imaging device 835 to the console 810, and the imaging device 835 receives one or more calibration parameters from the console 810 to adjust one or more imaging parameters (e.g., focal length, focus, frame rate, ISO, sensor temperature, shutter speed, and/or aperture).

The I/O interface device 840 is a device that allows a user to send action requests to the console 810. An action request is a request to perform a particular action. For example, an action request may be to start or end an application or to perform a particular action within the application. The interface device 840 may include one or more input devices. Example input devices include, without limitation, a keyboard, a mouse, a game controller, or any other suitable device for receiving action requests and communicating the received action requests to the console 810. An action request received by the I/O interface device 840 is communicated to the console 810, which performs an action corresponding to the action request. In some embodiments, the I/O interface device 840 may provide haptic feedback to the user in accordance with instructions received from the console 810. For example, haptic feedback is provided when an action request is received, or the console 810 communicates instructions to the I/O interface device 840 causing the I/O interface device 840 to generate haptic feedback when the console 810 performs an action.

The console 810 provides content to the viewing apparatus 200 for presentation to the user in accordance with information received from one or more of: the imaging device 835, the viewing apparatus 200, the I/O interface device 840, and the ETU 830. In the example of FIG. 8, the console 810 includes an application store 845, an apparatus tracking module 850, an artificial reality engine 855, and an eye-tracking module 860. Some embodiments of the console 810 have different modules than those described in conjunction with FIG. 8. Similarly, the functions further described below may be distributed among components of the console 810 in a different manner than is described here.

The application store 845 stores one or more applications for execution by the console 810. An application is a group of instructions, that when executed by a processor, generates content for presentation to the user. Content generated by an application may be in response to inputs received from the user via movement of the viewing apparatus 200, the I/O interface device 840, or the ETU 830. Examples of applications include, without limitation, gaming applications, conferencing applications, video playback application, or other suitable applications.

The apparatus tracking module 850 calibrates the system 800 using one or more calibration parameters and may adjust one or more calibration parameters to reduce error in determination of the position of the viewing apparatus 200. For example, the apparatus tracking module 850 adjusts the focus of the imaging device 835 to obtain a more accurate position for observed positional indicators on the viewing apparatus 200. Moreover, calibration performed by the apparatus tracking module 850 also accounts for information received from the IMU 212. Additionally, if tracking of the viewing apparatus 200 is lost (e.g., the imaging device 835 loses line of sight of at least a threshold number of the positional indicators 208-209), the apparatus tracking module 850 re-calibrates some or all of the system 800.

The apparatus tracking module 850 tracks movements of the viewing apparatus 200 using slow calibration information from the imaging device 835. The apparatus tracking module 850 determines positions of a reference point of the viewing apparatus 200 using observed positional indicators from the slow calibration information and a model of the viewing apparatus 200. The apparatus tracking module 850 also determines positions of a reference point of the viewing apparatus 200 using position information from the fast calibration information. Additionally, in some embodiments, the apparatus tracking module 850 may use portions of the fast calibration information, the slow calibration information, or some combination thereof, to predict a future location of the viewing apparatus 200. The apparatus tracking module 850 provides the estimated or predicted future position of the viewing apparatus 200 to the artificial reality engine 855.

The engine 855 executes applications within the system 800 and receives position information, acceleration information, velocity information, predicted future positions, or some combination thereof of the viewing apparatus 200 and the ETU 830 from the apparatus tracking module 850. Based on the received information, the engine 855 determines content to provide to the viewing apparatus 200 for presentation to the user. For example, if the received information indicates that the user has looked to the left, the engine 855 generates content for the viewing apparatus 200 that mirrors the user's movement in a virtual environment. Similarly, if information received from the eye tracking unit indicates the user gazing on a location, the engine 855 generates content based on the identified gazing location, such as a visual representation of the scene at the gazing location with an original display resolution and surrounding scenes with a reduced display resolution. Additionally, in some embodiments, if the received information indicates that tracking of the eye tracking unit is lost, the engine 855 generates content indicating the viewing apparatus 200 is to be adjusted for presentation by the viewing apparatus 200. Additionally, the engine 855 performs an action within an application executing on the console 810 in response to an action request received from the I/O interface device 840, or the ETU 830 and provides feedback to the user that the action was performed. The provided feedback may be visual or audible feedback via the viewing apparatus 200 or haptic feedback via the I/O interface device 840. For example, the engine 855 receives an action from the eye tracking unit to open an application, so the engine 855 opens the application and presents content from the application to the user via the viewing apparatus 200.

In some embodiments, the engine 855 can be configured to utilize, in association with the console 810 and the viewing apparatus 200, the eye tracking information obtained from the ETU 830 for a variety of display and interaction applications. The various applications include, but are not limited to, providing user interfaces (e.g., gaze-based selection), attention estimation (e.g., for user safety), gaze-contingent display modes (e.g., foveated rendering, varifocal optics, adaptive optical distortion correction, synthetic depth of field rendering), metric scaling for depth and parallax correction (e.g., IPD and eye-box adjustment), etc. In some embodiments, based on information about position and orientation of the user's eye received from the ETU 830, the engine 855 determines resolution of the content provided to the viewing apparatus 200 for presentation to the user on the display unit 300. The engine 855 provides the content to the viewing apparatus 200 having a maximum pixel density (maximum resolution) on the display unit 300 in a foveal region of the user's gaze, whereas the engine 855 provides a lower pixel resolution in other regions of the display unit 300, thus achieving less power consumption at the viewing apparatus 200 and saving computing cycles of the console 810 without compromising a visual experience of the user.

The eye-tracking module 860 may receive eye-tracking data from ETU 830 and determine the position of the user's eye based on the eye-tracking data. In some embodiments, the eye-tracking data includes an approximate position of the eye and data from a non-LED sensor. Thus, the non-LED sensor data can be used to refine the approximate position of the eye.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HIVID, a mobile device or computing system, or any other hardware platform capable of providing artificial reality content to one or more viewers.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   receiving, at an light-emitting diode (LED) device of a viewing apparatus, light reflected from an eye, the LED device being reverse-biased and positioned within a field-of-view of the eye, the LED device having a p-type semiconductor layer and an n-type semiconductor layer enclosed within a mesa-shaped semiconductor structure, wherein the light is intensified by the mesa-shaped semiconductor structure;
   generating, at the reverse-biased LED device, a signal based on the intensified light; and
   causing determination of a position of the eye based on the generated signal.

2. The method of claim 1, wherein the LED device is a first LED device; and
   wherein the method further comprises:
   prior to receiving the light, transmitting the light toward the eye from a second LED device that is forward-biased.

3. The method of claim 2, wherein the LED device is forward-biased at a first time to transmit the light to the eye; and
   wherein the LED is reverse-biased at a second time to receive the light reflected from the eye.

4. The method of claim 1, wherein the reverse-biased LED device is positioned on a transparent substrate in front of the eye.

5. The method of claim 4, wherein the transparent substrate is a layer of a lens of the viewing apparatus.

6. The method of claim 1, wherein causing determination of the position of the eye comprises:
   determining, based on the signal an approximate position of the eye;
   refining the approximate position of the eye based on data collected from a non-LED sensor; and
   determining the position of the eye based on the refined approximate position.

7. The method of claim 1, wherein the reverse-biased LED device is included in an array of reverse-biased LED devices positioned within the field-of-view.

8. The method of claim 1, wherein the viewing apparatus is part of an artificial reality device.

9. A viewing apparatus comprising:
an light-emitting diode (LED) device positioned within a field-of-view of an eye, the LED device being reverse-biased and having a p-type semiconductor layer and an n-type semiconductor layer enclosed within a mesa-shaped semiconductor structure and being configured to:
receive light reflected from the eye, the received light being intensified by the mesa-shaped semiconductor structure;
generate a signal based on the intensified light; and
cause determination of a position of the eye based on the generated signal.

10. The viewing apparatus of claim 9, wherein the LED device is a first LED device; and
wherein the viewing apparatus further includes second LED device, the second LED device being forward-biased and configured to transmit the light toward the eye prior to the reverse-biased second LED device receiving the light.

11. The viewing apparatus of claim 9, wherein the LED device is forward-biased at a first time to transmit the light to the eye; and
wherein the LED device is reversed-biased at a second time to receive the light reflected from the eye.

12. The viewing apparatus of claim 9, wherein the reverse-biased LED device is positioned on a transparent substrate in front of the eye.

13. The viewing apparatus of claim 12, wherein the transparent substrate is a layer of a lens of the viewing apparatus.

14. The viewing apparatus of claim 9, wherein the position of the eye is determined based on:
determining, based on the signal an approximate position of the eye;
refining the approximate position of the eye based on data collected from a non-LED sensor; and
determining the position of the eye based on the refined approximate position.

15. The viewing apparatus of claim 9, wherein the reverse-biased LED device is included in an array of reverse-biased LED devices positioned within the field-of-view.

16. The viewing apparatus of claim 9, wherein the viewing apparatus is part of an artificial reality device.

17. A system comprising:
light-emitting diode (LED) device positioned within a field-of-view of an eye, the LED device being reverse-biased and having a p-type semiconductor layer and an n-type semiconductor layer enclosed within a mesa-shaped semiconductor structure and being configured to:
receive light reflected from the eye, the received light being intensified by the mesa-shaped semiconductor structure;
generate a signal based on the intensified light; and
cause determination of a position of the eye based on the generated signal.

18. The system of claim 17, wherein the LED device is a first LED device;
wherein the viewing apparatus further a second LED device, the second LED device being forward-biased and configured to transmit the light toward the eye prior to the reverse-biased second LED device receiving the light.

19. The system of claim 17, where the mesa-shaped semiconductor structure is configured to, when the LED device is forward-biased to generate the light, reflect the light out of the mesa-shaped semiconductor structure as collimated light.

20. The system of claim 17, further comprising:
an array of reverse-biased LED devices configured to generate signals, each signal from each reversed-biased LED device representing an intensity of light received by the reverse-biased LED device; and
a controller configured to determine a position of the eye based on identifying, based on the signals, a subset of the reverse-biased LED devices that receives the light of the lowest intensity within the array of reverse-biased LED devices.

21. The system of claim 20, wherein the controller is configured to:
generate content based on the position of the eye; and
output the content to a display device for display.

* * * * *